(12) United States Patent
Cho et al.

(10) Patent No.: US 7,184,805 B2
(45) Date of Patent: Feb. 27, 2007

(54) HINGE DEVICE OF SWING-TYPE PORTABLE TERMINAL

(75) Inventors: Jin-Hee Cho, Suwon-si (KR); Yong-Jae Kim, Suwon-si (KR); Young-Min Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 108 days.

(21) Appl. No.: 11/019,891

(22) Filed: Dec. 21, 2004

(65) Prior Publication Data

US 2005/0221874 A1   Oct. 6, 2005

(30) Foreign Application Priority Data

Apr. 2, 2004   (KR) ...................... 10-2004-0022906

(51) Int. Cl.
*H04M 1/00* (2006.01)
(52) U.S. Cl. ............... 455/575.4; 455/575.1; 455/575.3
(58) Field of Classification Search ............. 455/575.4, 455/575.3, 575.1
See application file for complete search history.

(56) References Cited

U.S. PATENT DOCUMENTS 6,633,643 B1 * 10/2003 Ona ...................... 379/433.13
2003/0040288 A1 * 2/2003 Kang et al. .................... 455/90
2005/0104955 A1 * 5/2005 Navntoft .................. 348/14.02
2005/0137000 A1 * 6/2005 Toh et al. ................. 455/575.4
2005/0221874 A1 * 10/2005 Cho et al. ................ 455/575.4
2005/0245294 A1 * 11/2005 Gupte et al. ............. 455/575.1

FOREIGN PATENT DOCUMENTS

EP   0 851 644 A2 * 12/1997

\* cited by examiner

*Primary Examiner*—Lester G. Kincaid
*Assistant Examiner*—Charles Shedrick
(74) *Attorney, Agent, or Firm*—The Farrell Law Firm

(57) ABSTRACT

Disclosed is a hinge device for a swing-type portable terminal having a first housing, a second housing adapted to be rotated about a hinge axis extending perpendicularly to the front surface of the first housing while facing it, and a hinge device for coupling the second housing to the first housing in such a manner that it can be rotated while facing the latter, including a first hinge cam fixedly coupled to the first housing and exposed to a surface of the first housing, a hinge shaft positioned in the second housing and extending along the hinge axis to be fixedly coupled to the first hinge cam, and a second hinge cam fixedly coupled to the second housing and adapted to reciprocate linearly on the hinge shaft along the hinge axis and to be rotated about the hinge axis while facing the first hinge cam.

9 Claims, 7 Drawing Sheets

HINGE DEVICE OF SWING-TYPE PORTABLE TERMINAL

PRIORITY

This application claims priority to an application entitled "Hinge Device Of Swing-Type Portable Terminal" filed with the Korean Intellectual Property Office on Apr. 2, 2004 and assigned Ser. No. 2004-22906, the contents of which are hereby incorporated by reference.

BACKGROUND OF THE INVENTION

1. Field of the Invention

The present invention relates to a portable terminal, and more particularly to a swing-type portable terminal having a pair of housings coupled to each other in such a manner that they can be rotated while facing each other.

2. Description of the Related Art

In general, portable terminals are used to connect users with service providers or with other users via base stations in a wireless manner for providing communication services. The portable terminals may be classified into bar-type terminals, flip-type terminals, and folder-type terminals according to their appearance.

The bar-type terminals have a single body housing, on which data input/output means and transmitter/receiver units are positioned. However, these terminals have a problem in that their keypad, which is used as the data input means, is always exposed and may be operated erroneously. In addition, there exists a limitation in making the bar-type terminals compactly, because a distance must be maintained between the transmitter and receiver units of the terminals.

The flip-type terminals have a body, a flip, and a hinge module for connecting the body with the flip. The body has data input/output means and transmitter/receiver units positioned thereon. The flip is adapted to cover the keypad, which is used as the data input means, so that any erroneous operation thereof can be avoided. However, there still exists a limitation in making the flip-type terminals compactly, because a distance must be maintained between the transmitter and receiver units of the terminals.

The folder-type terminals have a body, a folder, and a hinge module for connecting the body with the folder in such a manner that the folder can be rotated in a direction approaching or away from the body to open/close the terminal. During a standby mode, the folder is folded onto the body to avoid any erroneous operation of the keypad. During a speech mode, the folder is unfolded to establish a sufficient distance between the transmitter and receiver units. This is beneficial to making the folder-type terminals compactly. For this reason, most recent portable terminals are configured as folder-type terminals.

The hinge module of the flip-type or folder-type terminals, which couples the flip or folder to the body in such a manner that it can be rotated, exerts a force in such a direction that the flip or the folder is automatically opened without any additional application of force from a user, when the flip or folder is rotated a predetermined angle or more from the body, or in such a direction that it is folded onto the body, when it is rotated less than the predetermined angle.

Recently, users' tastes in choosing portable terminals have been diversified and their demands for information have increased dramatically. However, current research and development on portable terminals have not met such recent demands. Although swing-type portable terminals have appeared, which have a pair of housings coupled to each other in such a manner that they can be rotated while facing each other, the construction of a hinge device for connecting the pair of housings to each other, while the terminal performs a swing motion, is still unsatisfactory.

SUMMARY OF THE INVENTION

Accordingly, the present invention has been made to solve the above-mentioned problems occurring in the prior art, and an object of the present invention is to provide a hinge device of a swing-type portable terminal for connecting a pair of housings to each other in such a manner that they can be rotated while facing each other.

In order to accomplish this object, there is provided a hinge device of a swing-type portable terminal having a first housing, a second housing adapted to be rotated about a hinge axis extending perpendicularly to the front surface of the first housing while facing it, and a hinge device for coupling the second housing to the first housing in such a manner that the second housing can be rotated while facing the latter, the hinge device including a first hinge cam fixedly coupled to the first housing and exposed to a surface of the first housing; a hinge shaft positioned in the second housing and extending along the hinge axis to be fixedly coupled to the first hinge cam; and a second hinge cam fixedly coupled to the second housing and adapted to reciprocate linearly on the hinge shaft along the hinge axis and to be rotated about the hinge axis while facing the first hinge cam.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
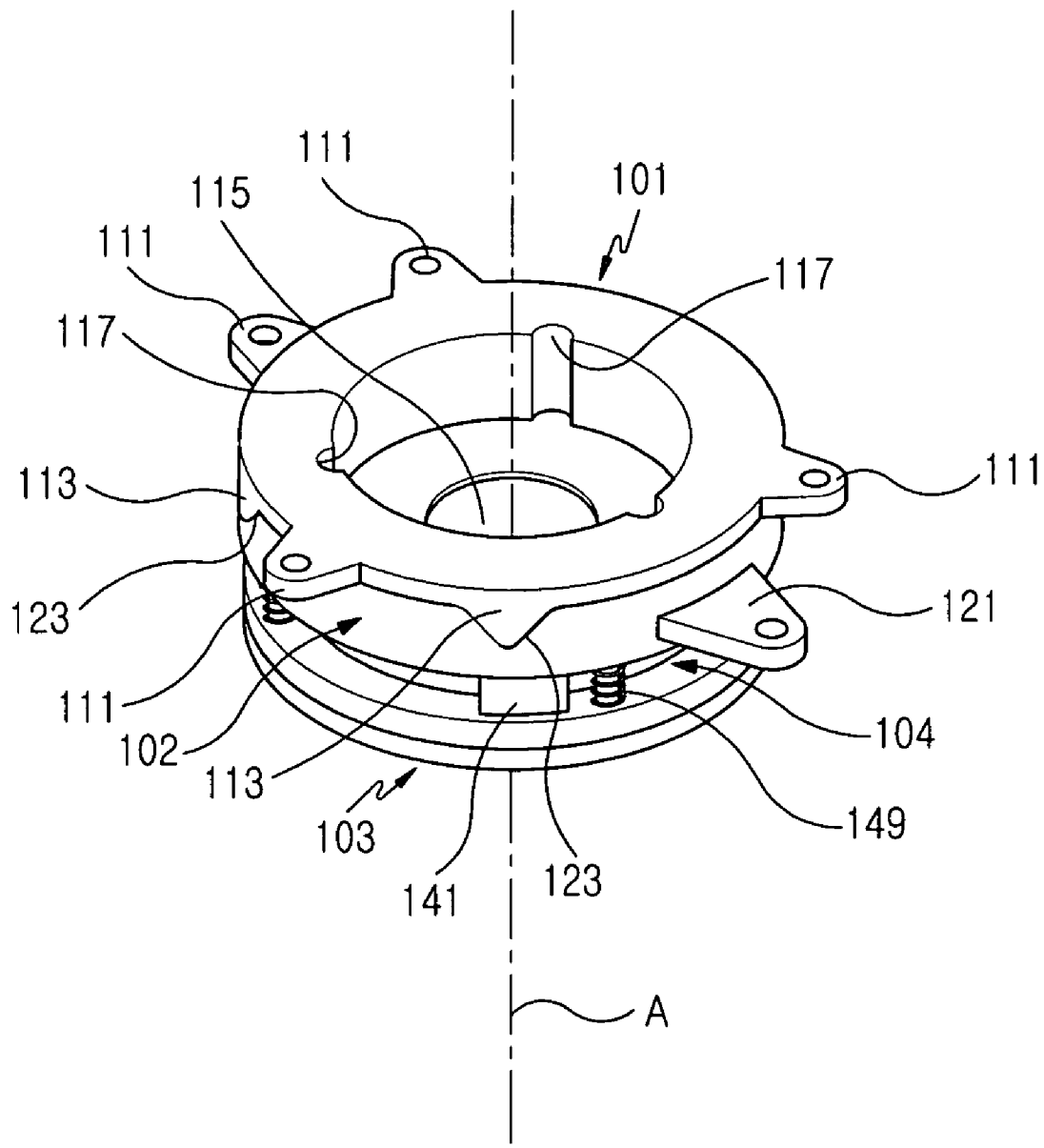
FIG. 1 is a perspective view showing a hinge device of a swing-type portable terminal according to a preferred embodiment of the present invention.
Figure 2:
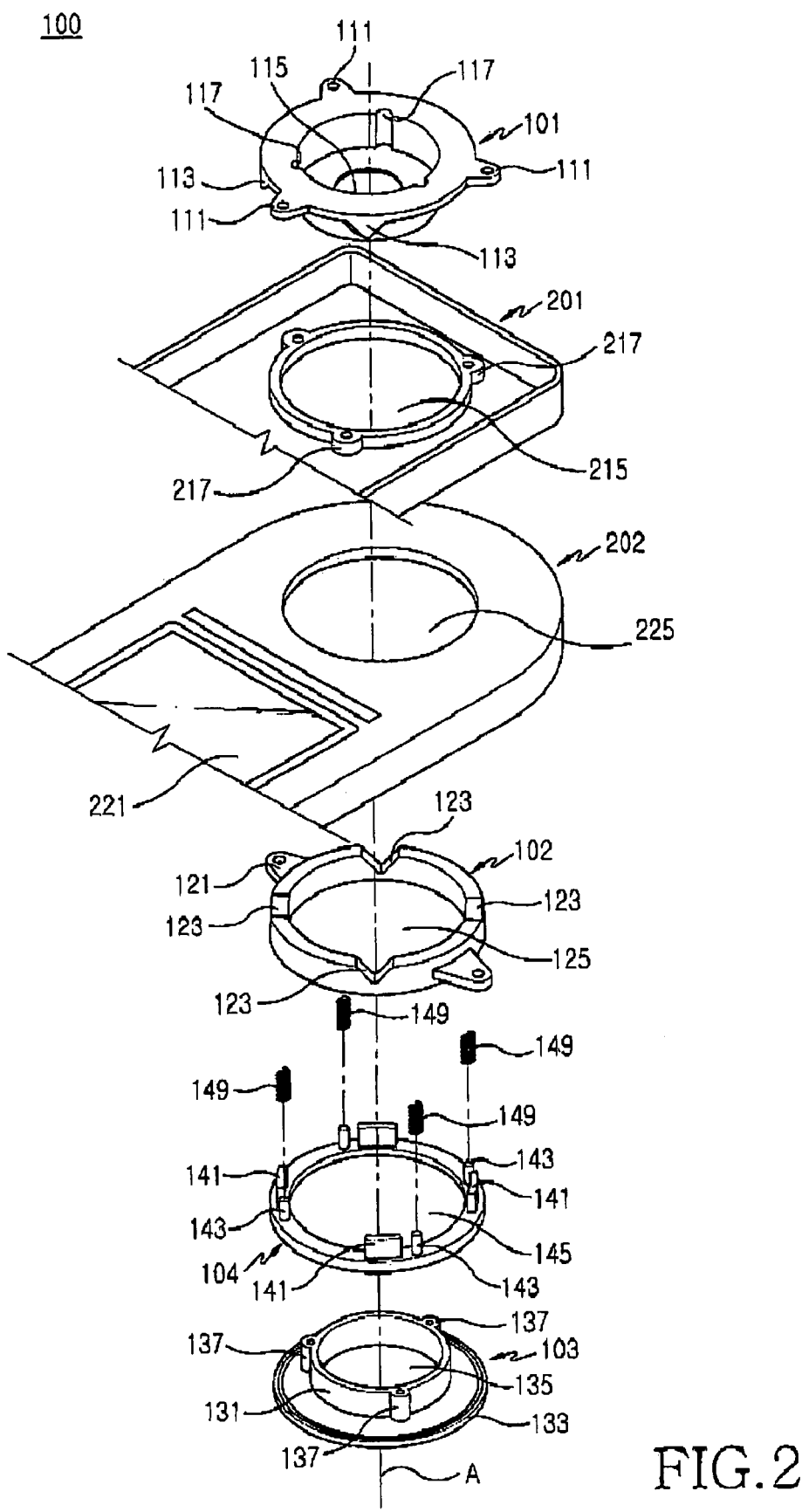
FIG. 2 is an exploded perspective view showing how the hinge device shown in FIG. 1 is coupled to a portable terminal.
Figure 3:
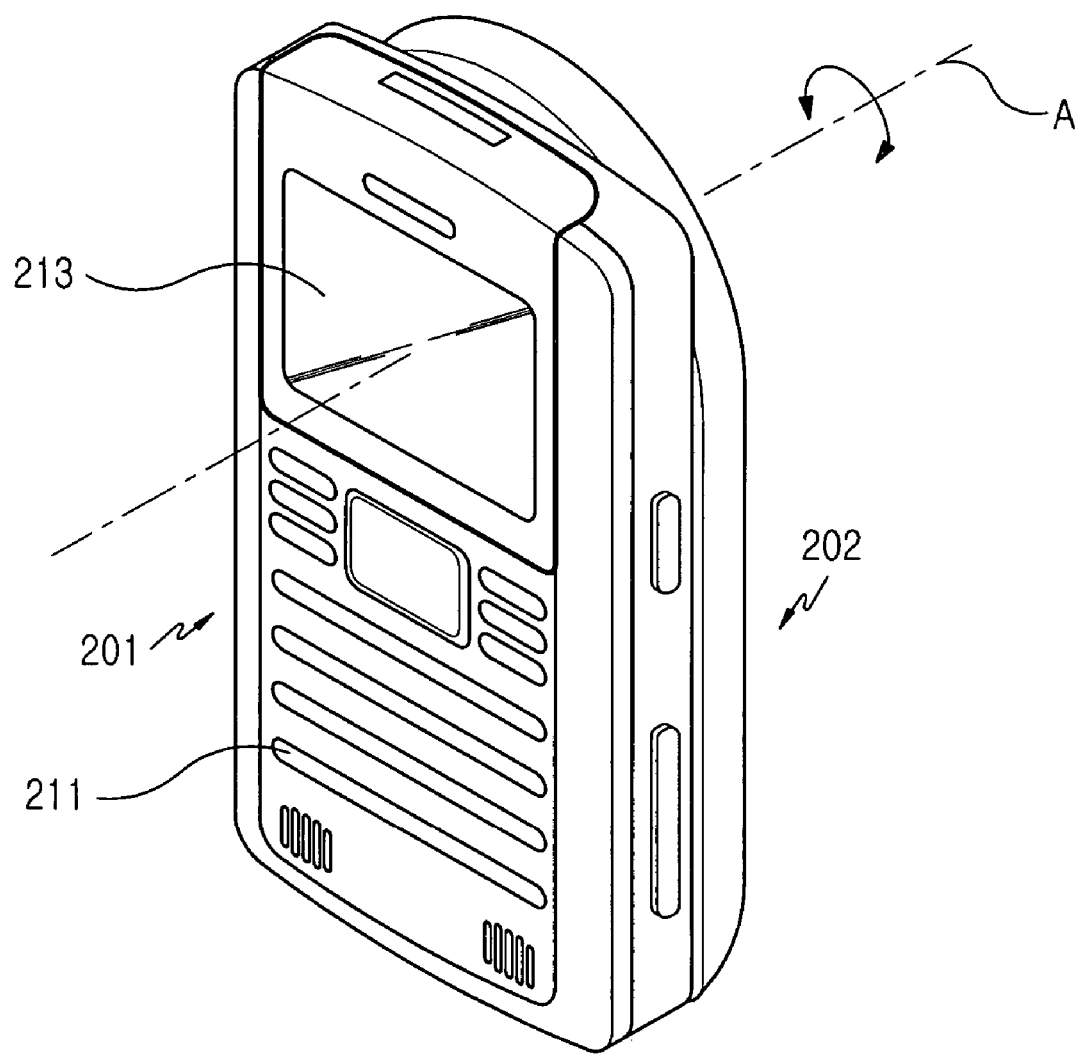
FIG. 3 is a perspective view showing a swing-type portable terminal having the hinge device shown in FIG. 1 mounted therein.
Figure 4:
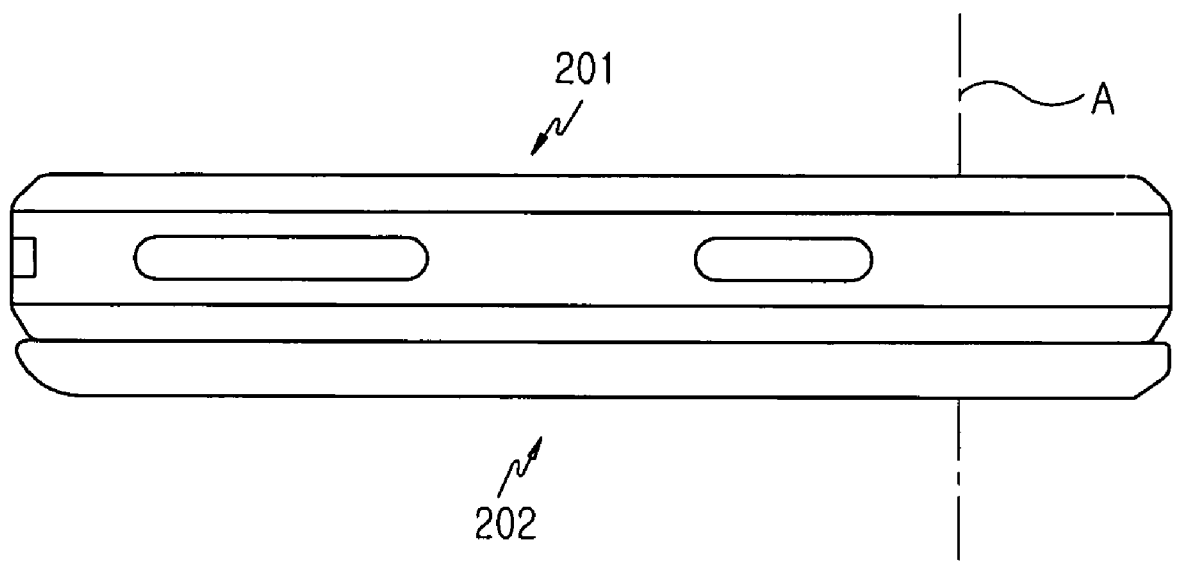
FIG. 4 is a side view of the portable terminal shown in FIG. 3.
Figure 5:
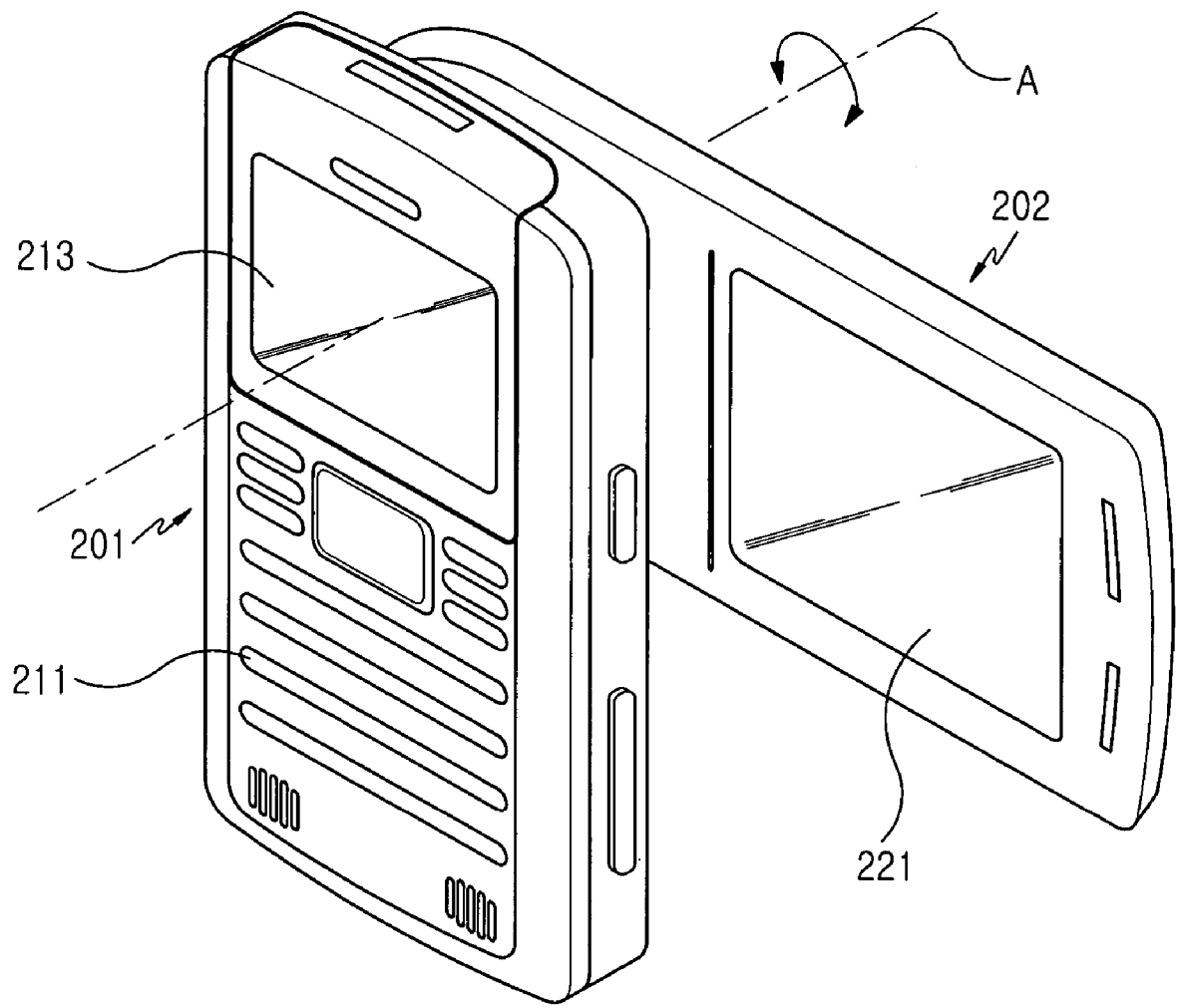
FIG. 5 is a perspective view showing the rotation of a second housing of the portable terminal shown in FIG. 3.
Figure 6:
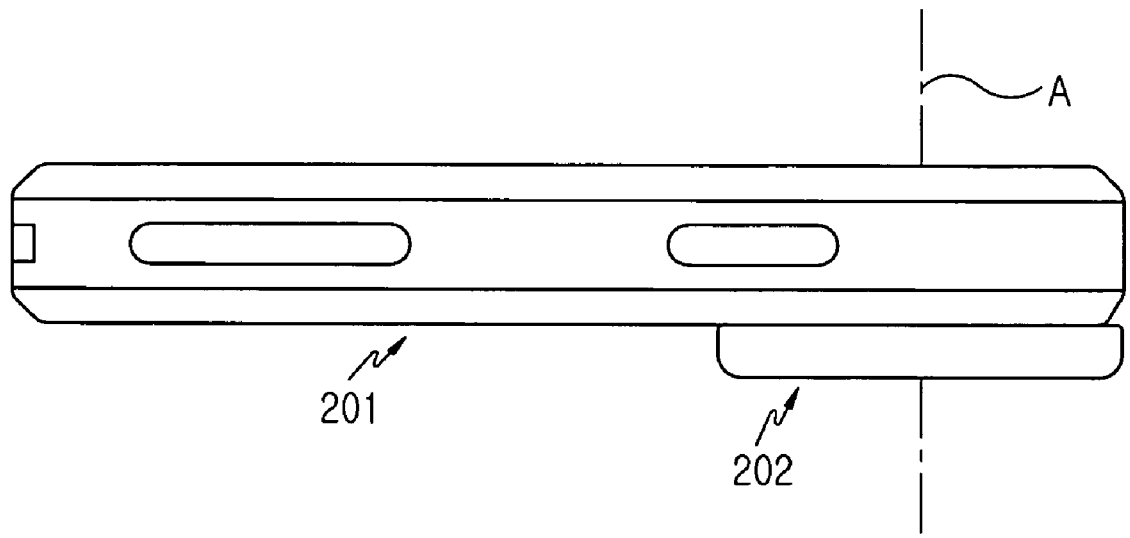
FIG. 6 is a side view of the portable terminal shown in FIG. 5.

FIG. 1 is a perspective view showing a hinge device 100 of a swing-type portable terminal 200 (shown in FIG. 3) according to a preferred embodiment of the present invention, and FIG. 2 is an exploded perspective view showing how the hinge device 100 shown in FIG. 1 is coupled to the portable terminal 200. As shown in FIGS. 1 and 2, the hinge device 100 of a swing-type portable terminal 200 according to a preferred embodiment of the present invention includes a first hinge cam 101, a second hinge cam 102, a hinge shaft 103, a swing plate 104, and an elastic means 149. The hinge device 100 couples the first and second housings 201 and 202 to each other, which constitutes the swing-type portable terminal 200, in such a manner they can be rotated while facing each other. The first and second hinge cams 101 and 102 are coupled to each other in such a manner that they can be rotated, while facing each other, about a hinge axis A extending along the forward and rearward directions of the terminal 200.

The first hinge cam 101 has the shape of a circular plate with a predetermined height along the hinge axis A. The first hinge cam 101 has fastening pieces 111 extending from its outer peripheral surface along the diametric direction thereof and at least one pair of cam protrusions 113 protruding from a surface thereof along the hinge axis A. The cam protrusions 113 are positioned on the outer peripheral surface of the first hinge cam 101 and are arranged with an equiangular spacing along the circumferential direction thereof.

The first hinge cam 101 is fastened to the inner surface of the first housing 201. The first housing 201 has a first hinge hole 215 formed on its surface to expose the first hinge cam 101 and a fastening portion 217 formed along the periphery of the first hinge hole 215. The fastening pieces 111 of the first hinge cam 101, which correspond to the fastening portion 217, is used to fix the first hinge cam 101 on the inner surface of the first housing 201.

The second hinge cam 102 has a ring shape. The second hinge cam 102 has a through-hole 125 formed therethrough for surrounding the outer peripheral surface of the first hinge cam 101 and at least one pair of cam holes 123 to be engaged with the cam protrusions 113. The second hinge cam 102 has at least one fastening piece 121 extending from its outer peripheral surface along its diametric direction to be engaged with the inner surface of the second housing 202. The second hinge cam 102 is exposed through a second hinge hole 225 formed through the second housing 202. When the first and second housings 201 and 202 are coupled to each other by the hinge device 100, the first and second hinge cams 101 and 102 are forced against each other. The second hinge cam 102 stops being rotated at a position where the cam protrusions 113 and the cam holes 123 are engaged with each other.

The hinge shaft 103 has a support shaft 131, which extends a predetermined distance along the hinge axis A and which has an end fastened to the first hinge cam 101, and a circular support plate 133 extending from the other end of the support shaft 131 along the diametric direction thereof. For an end of the support shaft 131 to be fastened to the first hinge cam 101, the first hinge cam 101 has fastening holes 117, and the hinge shaft 103 has fastening pieces 137 formed on the outer peripheral surface of the support shaft 131. When the first and second housings 201 and 202 are coupled to each other by the hinge device 100, the hinge shaft 103, particularly the support plate 133 is positioned in the second housing 201. The second hinge cam 102 is coupled to the support shaft 131 in such a manner that it can not only be rotated, but also reciprocate linearly between the first hinge cam 101 and the support plate 133 along the hinge axis A.

The first hinge cam 101 has an opening 115 extending in a plane perpendicular to the hinge axis A, and the support shaft 131 has a through-hole 135 extending in a plane perpendicular to the hinge axis A, so that the inner space of the first housing 201 is connected to that of the second housing 202 via the opening 115 and the through-hole 135.

The swing plate 104 has a coupling hole 145 formed therethrough and has the shape of a washer. The swing plate 104 is coupled to the support shaft 131 in such a manner that it can be rotated while making sliding contact with the support plate 133. The swing plate 104 is provided with, on its surface, coupling ribs 141 adapted to be coupled to the second hinge cam 102 in such a manner that they can be moved linearly, and swing plate 104 further includes support protrusions 143. When the coupling ribs 141 are coupled to the second hinge cam 102, the swing plate 104 can be rotated together with the second hinge cam 102, and the second hinge cam 102 can be moved linearly relative to the swing plate 104. The number and shape of the coupling ribs 141 can be modified, as long as the second hinge cam 102 and the swing plate 104 can be rotated together and moved linearly, relative to each other.

The elastic means 149 includes a number of coil springs coupled to the respective support protrusions 143 of the swing plate 104, and provides an elastic force in such a manner that the second hinge cam 102 is forced against the first hinge cam 101. More specifically, the second hinge cam 102 and the swing plate 104 are forced against and make a sliding contact with the first hinge cam 101 and the support plate 133, respectively, by the elastic force provided by the elastic means 149.

Referring to FIGS. 3 to 6, the swing type portable terminal 200 having a hinge device 100 configured as above includes a first housing 201 and a second housing 202 coupled to the first housing 201 in such a manner that it can be rotated, while facing the first housing 201, about a hinge axis A extending along the forward and rearward directions of the terminal 200.

The first housing 201 is provided with, on its front surface, a keypad 211 having a plurality of key buttons and a display device 213. The second housing 202 is coupled to the rear surface of the first housing 201 in such a manner that it can be rotated.

The second housing 202 is provided with a display device 221, preferably larger than display device 213, on its front surface, which is exposed or concealed as the second housing 202 is rotated about the hinge axis A.

As the second housing 202 is rotated about the hinge axis A, the cam protrusions 113 and the cam holes 123 of the hinge device 100 become engaged with each other at a predetermined angular interval stopping the second housing 202 from rotating.

In the present embodiment, two pairs of the cam protrusions 113 and the cam holes 123 are set apart at an interval of 90° along the circumferential direction of the first and second hinge cams 101 and 102, respectively. As the second housing 202 is rotated about the hinge axis A from a position where it coincides with the first housing 101, it stops rotating at 90° intervals.

It will be easily understood by those skilled in the art that the second housing 202 can be adapted to stop rotating at any angular position. As used herein, the phrase "the second housing 202 stops rotating" means that the cam protrusions 113 and the cam holes 123 are engaged with each other so that the second housing 202 stops rotating any further in the same direction and remains in the stopped state in a stable manner.

Preferably, the number of the cam holes 123 is greater than the number of the cam protrusions 113, with a minimum of two cam holes 123. This is because the cam protrusions 113 are engaged with the cam holes 123 at a position where they face each other, and if the number of the cam protrusions 113 is greater than that of the cam holes 123, some cam protrusions 113 would not be engaged with the cam holes 123, even when some other cam protrusions 113 face the cam holes 123.

Accordingly, when two pairs of the cam holes 123 are arranged with an interval of 90°, two pairs of the cam protrusions 113 must be arranged with an interval of 90°, or one pair thereof with an interval of 180°. The first hinge cam 101 may also have a single cam protrusion 113 formed thereon, regardless of the number and interval of the cam holes 123.

Alternatively, when the second hinge cam 102 has cam holes 123 arranged with an interval of 45°, the first hinge cam 101 may have cam protrusions 113 arranged with an interval of 45°, 90°, or 180°.

In summary, the number of the cam holes 123 of the second hinge cam 102 is greater than the number of c am protrusions 113 of the first hinge cam 101. Preferably, the number of the cam holes 123 of the second hinge cam 102 is a multiple of that of the cam protrusions 113 of the first hinge cam 101. It is obvious that the more cam holes 123 there are, the greater the number of positions at which the second housing 202 can stop rotating and lock in place.

If the second housing 202 is rotated and the cam protrusions 113 are disengaged from the cam holes 123, the second hinge cam 102 is moved linearly on the support shaft 131 along the hinge axis A. The second hinge cam 102 is then moved away from the first hinge cam 101, and the second housing 202 is moved linearly along the hinge axis A away from the first housing 101. Even if the second housing 202 is not rotated, it may be moved linearly a predetermined distance away from the first housing 101 by an external force. The distance the second housing 202 can travel away from the first housing 101 is limited to the distance the second hinge cam 102 can reciprocate linearly between the first hinge cam 101 and the support plate 133.

Figure 7:
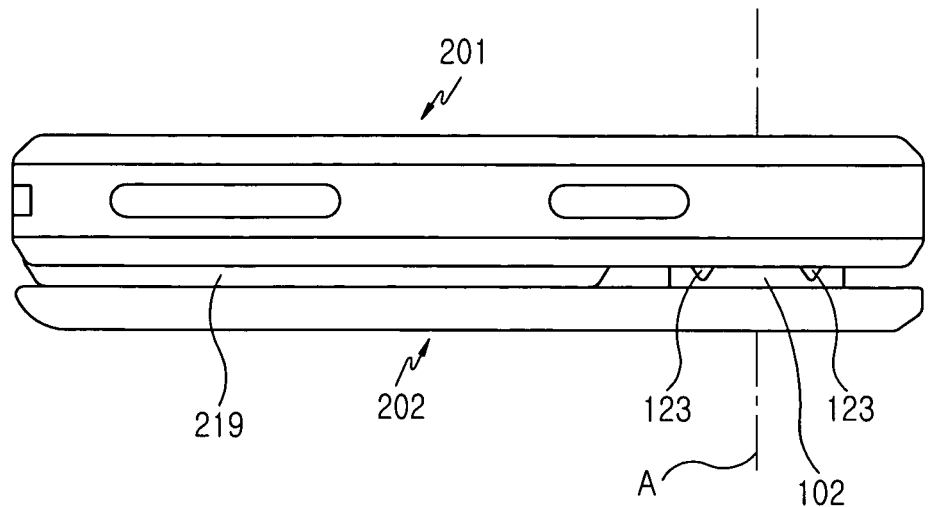
FIG. 7 is a side view of the portable terminal shown in FIG. 3, which has a large-capacity battery mounted thereon.
Figure 8:
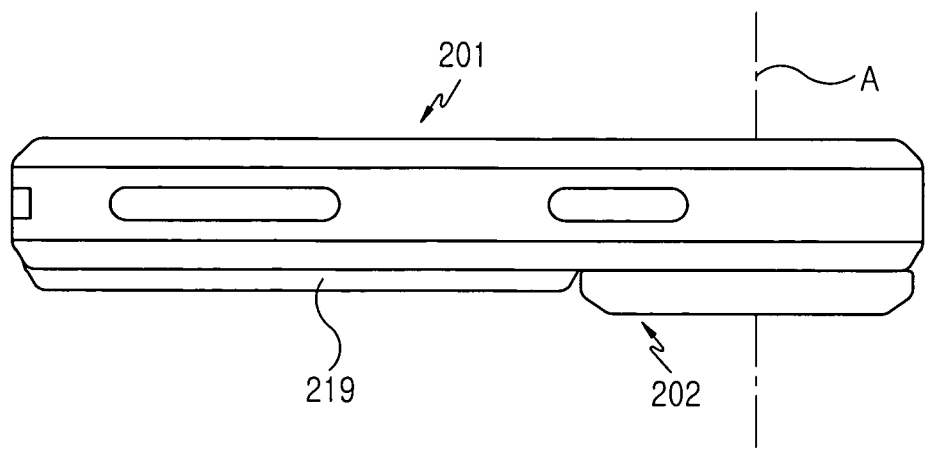
FIG. 8 is a side view of the portable terminal shown in FIG. 5, which has a large-capacity battery mounted thereon.

Referring to FIGS. 7 and 8, the portable terminal 200 has a battery 219 mounted on the rear surface of the first housing 201. The battery of the portable terminal 200 is interposed between the first and second housings 201 and 202. In general, batteries of a portable terminal have different thicknesses according to capacity. A large-capacity battery 219, as shown in FIGS. 7 and 8, protrudes a distance from the rear surface of the first housing 201. When the portable terminal 200 needs to have a large-capacity battery 219 mounted thereon, therefore, a space must be maintained between the first and second housings 201 and 202 so that the large-capacity battery 219 can be positioned therein.

The hinge device 100 of the swing-type portable terminal 200 according to the present invention is configured in such a manner that the second hinge cam 102 can be moved linearly in a direction approaching or away from the first hinge cam 101. Accordingly, the second housing 202 can be positioned away from the first housing 201, while the second housing 202 is being rotated, or when necessary, so that a space can be maintained to mount a large-capacity battery 219.

Consequently, it is easy to maintain a space to mount the large-capacity battery 219 while the first housing 201 is folded on the second housing 202. When the second housing 202 is rotated and completely disengaged from a battery mounting position, and the cam protrusions 113 and the cam holes 123 of the hinge device 100 are engaged with each other, the second housing 202 is again forced against the first housing 201.

The hinge device 100 is, therefore, operated in such a manner that, when the cam protrusions 113 and the cam holes 123 are engaged with each other, the first and second housings 201 and 202 are forced against each other, and, when the cam protrusions 113 and the cam holes 123 are disengaged from each other, the first and second housings 201 and 202 are spaced away from each other.

As mentioned above, the hinge device of a swing-type portable terminal according to the present invention has a pair of housings coupled to each other in such a manner that they can be rotated while facing each other. Accordingly, it is easy to configure a portable terminal of various types. It is possible to maintain a space to mount a large-capacity battery between the pair of housings, because they are coupled each other in such a manner that they can be rotated while facing each other and can be moved linearly in a direction approaching or away from each other. The pair of housings of the hinge device can also stop being rotated with a predetermined angular interval and lock in place. This makes it convenient to use the terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A hinge device of a swing-type portable terminal having a first housing, a second housing adapted to rotate about a hinge axis extending perpendicular to the front surface of the first housing, and a hinge device for coupling the second housing to the first housing to allow rotation while facing one another, the hinge device comprising:
   a first hinge cam fixedly coupled to the first housing;
   a hinge shaft fixedly coupled to the first hinge cam positioned in the second housing extending along the hinge axis; and
   a second hinge cam fixedly coupled to the second housing wherein the second hinge cam reciprocates linearly over the hinge shaft along the hinge axis and rotates about the hinge axis.

2. A hinge device of a swing-type portable terminal as claimed in claim 1, wherein the hinge shaft comprises a support shaft extending along the hinge axis and having an end fixedly coupled to the first hinge cam and an annular support plate extending from the outer peripheral surface of the opposite end of the support shaft, and the second hinge cam is adapted to reciprocate linearly over the support shaft.

3. A hinge device of a swing-type portable terminal as claimed in claim 2, further comprising a swing plate coupled to the support shaft, wherein the swing plate rotates together with the second hinge cam and is in sliding contact with the support plate, and an elastic means provided between the swing plate and the second hinge cam providing an elastic force which forces the second hinge cam against the first hinge cam.

4. A hinge device of a swing-type portable terminal as claimed in claim 1, further comprising at least one pair of cam protrusions protruding from a surface of the first hinge cam along the hinge axis and arranged at angular intervals along the circumferential direction thereof and at least one pair of cam holes corresponding to the cam protrusions, formed on a surface of the second hinge cam at corresponding angular intervals to that of the cam protrusions, and wherein the second hinge cam is adapted to stop rotating at a position where the cam protrusions and the cam holes engage with each other.

5. A hinge device of a swing-type portable terminal as claimed in claim 4, wherein the cam holes are arranged at an interval of 90°, and the cam protrusions are arranged with an interval of 90° or 180°.

6. A hinge device of a swing-type portable terminal as claimed in claim 4, wherein the number of the cam holes is greater than the number of the cam protrusions.

7. A hinge device of a swing-type portable terminal as claimed in claim 4, wherein the first and second housings are adapted to be forced against each other when the cam protrusions are engaged with the cam holes, and to be spaced away from each other, when the cam protrusions are disengaged from the cam holes.

8. A hinge device of a swing-type portable terminal as claimed in claim 1, wherein the first and second housings rotate in parallel planes with respect to one another.

9. A hinge device of a swing-type portable terminal, comprising:
 a first housing;
 a second housing oriented in a parallel plane to the first housing and rotated about a hinge axis extending perpendicular to the front surface of the first housing; and
 a hinge device for coupling the second housing to the first housing, the hinge device including:
  a first hinge cam fixedly coupled to the first housing;
  a hinge shaft positioned in the second housing and extending along the hinge axis to be fixedly coupled to the first hinge cam; and
  a second hinge cam fixedly coupled to the second housing wherein the second hinge cam reciprocates linearly on the hinge shaft along the hinge axis and rotates about the hinge axis while remaining in a parallel plane with the first hinge cam.

* * * * *